June 11, 1963
T. F. ERICKSON
3,093,247
COLLAPSIBLE RACK
Filed Feb. 25, 1960
2 Sheets-Sheet 1
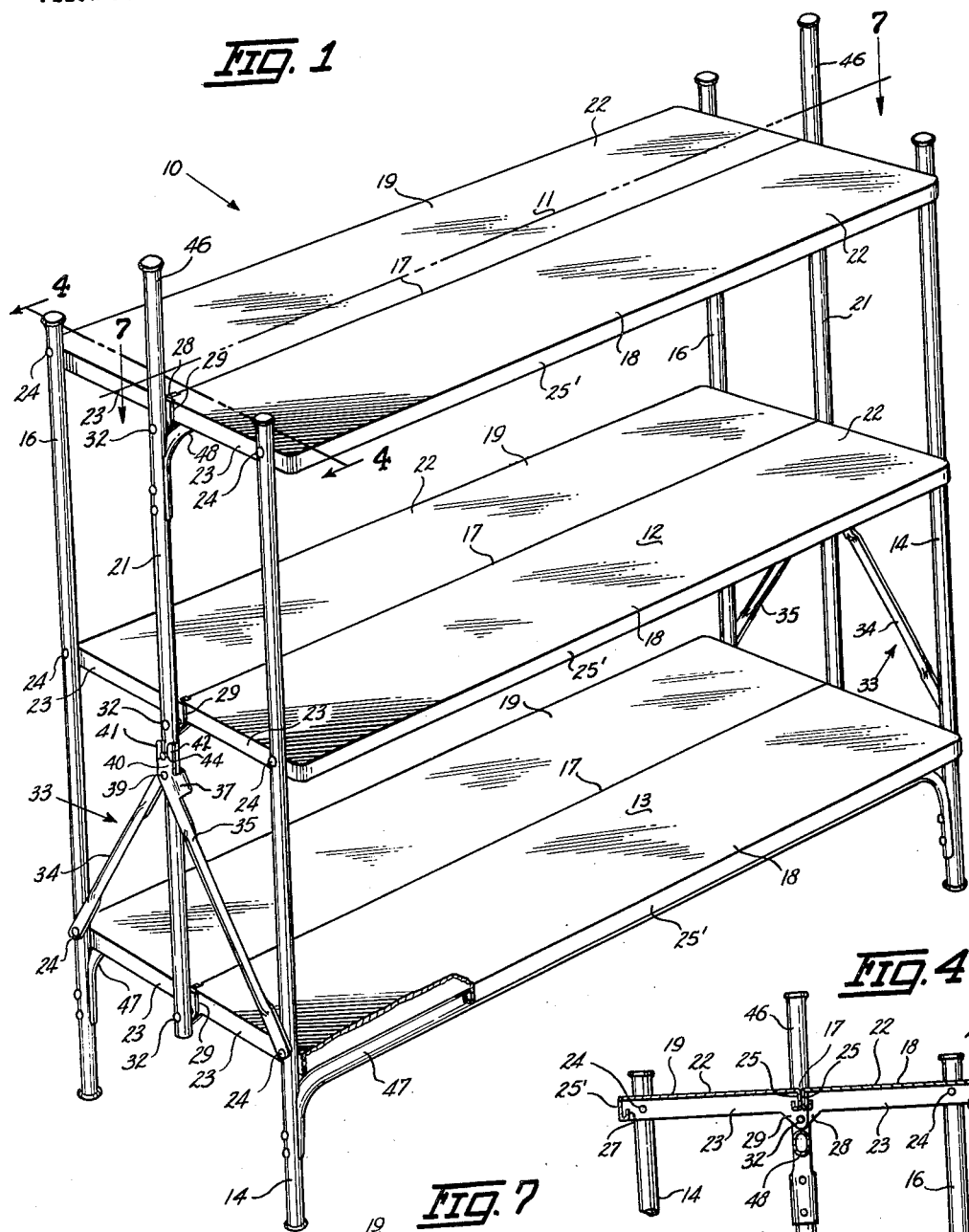
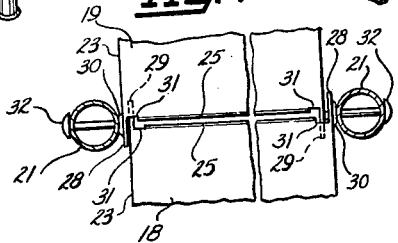
INVENTOR.
THEODORE F. ERICKSON
BY Lowell & Henderson
ATTORNEYS.

June 11, 1963     T. F. ERICKSON     3,093,247
COLLAPSIBLE RACK

Filed Feb. 25, 1960     2 Sheets-Sheet 2

INVENTOR.
THEODORE F. ERICKSON
BY
Lowell & Henderson
ATTORNEYS.

3,093,247
United States Patent Office
Patented June 11, 1963

---

3,093,247
COLLAPSIBLE RACK
Theodore F. Erickson, Des Moines, Iowa, assignor to C. E. Erickson Co., Inc., Des Moines, Iowa, a corporation of Iowa
Filed Feb. 25, 1960, Ser. No. 10,965
3 Claims. (Cl. 211—149)

This invention relates to furniture for home or store use, and more particularly to a portable, collapsible rack having one or more shelf units on which articles can be placed.

An object of this invention is the provision of an improved collapsible rack having one or more shelves for holding various articles.

Another object of this invention is the provision of a rack as described above which is foldable from a position where the shelves are horizontally disposed to a compact position where the shelves are folded and vertically disposed, the change in positions being accomplished by one manual movement applied to the rack.

A further object is the provision of a rack as described above wherein by merely grasping a pair of conveniently placed hand grips, the rack can be folded into a compact unit for transportation or storage purposes by one lifting movement of the hands.

Yet another object of this invention is the provision of a relatively lightweight, yet sturdy and simple rack structure, economical to manufacture and effective in use.

These objects, and other features and advantages of this invention will become readily apparent upon reference to the following description when taken in conjunction with the accompanying drawings, wherein:

FIG. 1 is a perspective view of one embodiment of the collapsible rack of this invention in an unfolded, usable position, with certain parts broken away for purposes of clarity;

FIG. 4 is a fragmentary sectional view taken along the line 4—4 of FIG. 1;

FIG. 7 is an enlarged foreshortened detail sectional view taken along the line 7—7 in FIG. 1.

Figure 2:
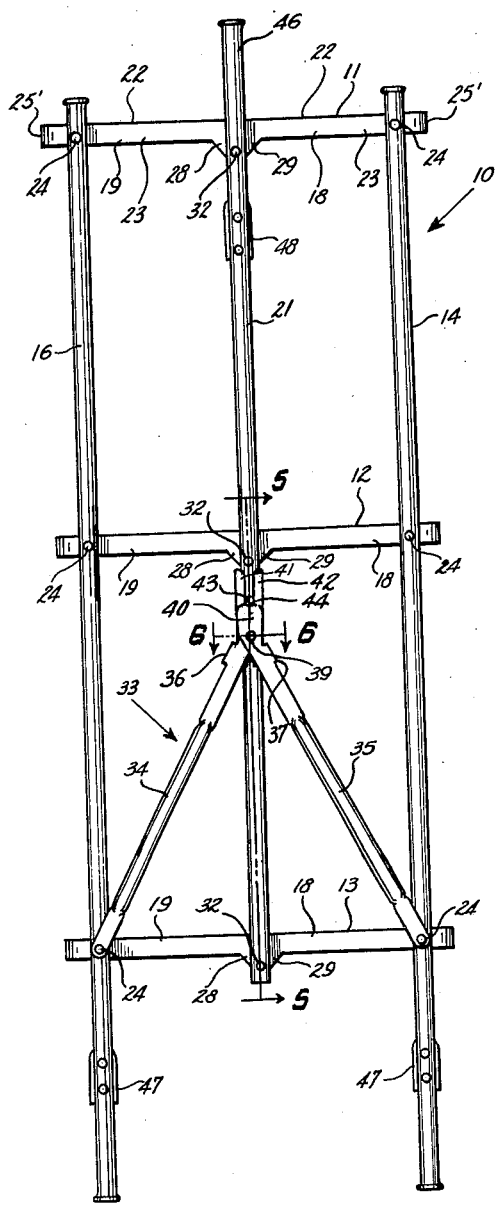
FIG. 2 is an enlarged end elevational view of the rack of FIG. 1 in its unfolded position.

Referring now to the drawings and particularly to FIG. 1, the collapsible rack of this invention is generally indicated at 10 and comprises three vertically spaced foldable rectangular shelf units or shelves 11, 12 and 13, each of which is pivotally supported at the corners thereof by two pairs of tubular upright side supports 14 and 16. Each shelf 11, 12 and 13 is divided along its longitudinal axis 17 into a pair of sections or shelf members 18 and 19, which are hinged to each other and to a pair of tubular upright center supports or lift elements 21. By virtue of this arrangement, as will be clarified hereinafter, the rack 10 can be changed from an unfolded position of FIGS. 1 and 2, wherein the shelves are horizontally disposed, to a folded position of FIG. 3 where the shelf members are vertically disposed in a back to back relation.

The shelves 11, 12 and 13 are identical and therefore only the upper shelf 11 will be described, with like parts of the other shelves being indicated by like reference numerals. Shelf 11 is comprised of the pair of aforementioned shelf sections of members 18 and 19 (FIG. 4) which are also identical. The section 18 has a flat top 22, depending end flanges 23, and inner and outer side flanges 25 and 25', respectively. Adjacent the outer end of each end flange 23, there is inserted a pivot pin 24 for pivotal connection with a respective support 14 and 16. The outer side flanges 25' have depending legs turned inwardly toward each other (FIG. 4) and terminate in upturned extensions 27.

At the inner corners of each end flange 23 (FIG. 4) outwardly and downwardly extended lips 28 and 29, respectively, are provided. Each lip is of a triangular shape and has a circular, dished depression 30 formed therein (FIG. 7). Thus, by the provision of a notch 31 (FIG. 7) formed inwardly along the inner side flange 25 of each shelf member, the members 18 and 19 can be placed side by side as best indicated in FIG. 7. In this contiguous position of the shelf members 18 and 19, their end flange lip depressions 30 are nested at each inner corner thereof and openings (not shown) centrally of the depressions 30 are aligned. A pivot pin 32 (FIGS. 4 and 7) is inserted through each pair or set of nested lips 28 and 29 for pivotal coaction therebetween, and through an adjacent lift element 21 for pivotal coaction between the element 21 and the lips 28 and 29. It will be noted (FIG. 7) that the lip 28 of one shelf lies outside the lip 29 of the other shelf, and vice versa at the other corner, providing for ease of manufacture and assembly.

By this arrangement, the shelf members 18 and 19 lie coplanar in their unfolded positions to form a substantially continuous flat surface, since their inner side flanges 25 are contiguous to obviate unnecessary space therebetween. Thus, the shelf members 18 and 19 of each shelf 11, 12 and 13 are pivotally connected at their outer corners to the four side supports 14 and 16, and are pivotally connected at their inner corners to the two lift elements or center supports 21. In their unfolded positions, the shelves 11, 12 and 13 are vertically aligned and spaced apart a like distance.

Figure 6:
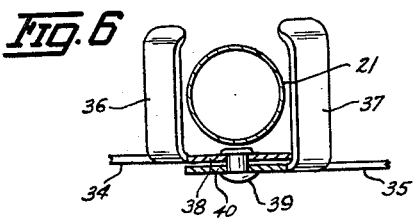
FIG. 6 is an enlarged detail sectional view taken along the line 6—6 in FIG. 2.

To support the shelves 11, 12 and 13 in their unfolded positions, and to prevent them from sagging downwardly along their axes 17, a locking unit 33 (FIG. 1) slidable on a center support 21 is provided at each end of the rack 10. Each unit 33 includes a pair of elongated braces 34 and 35 pivotally connected at their lower ends to the corner pivot pins 24 for the lower shelf 13, and pivotally connected at their upper ends by a pivot pin 39. To maintain a slidable or movable encircling connection with the adjacent lift element 21, each brace 34 and 35 is provided with an ear 36 and 37 (FIGS. 1 and 6), respectively, adjacent the pivot pin 39. The ears are complementary with the lift element 21 and relative to each other in that they curve about the periphery of the lift element 21 on both sides thereof and retain their encircling relation irrespective of the pivoted position of the braces 34 and 36. Thus, each lift element 21 and its associated pair of braces 34 and 35 are longitudinally movable relative to each other.

Each locking unit 33 is arranged so that when the shelves 11, 12 and 13 are horizontally disposed, the two lift elements 21 to which they are connected are maintained against downward movement. This is accomplished by virtue of a stop pin 43 secured to each lift element 21 engaging the corresponding braces 34 and 35 within a notch 44 (FIG. 2) formed thereby. To form the notch 44, the upepr ends 38 and 40, respectively, of the braces 34 and 35 have upstanding projections 41 and 42, respectively, which are offset from the remainder of the ends so as to be transversely spaced apart. Thus each lift element 21 is held or supported in the position of FIG. 2 by the bracing position of a locking unit 33.

Figure 3:
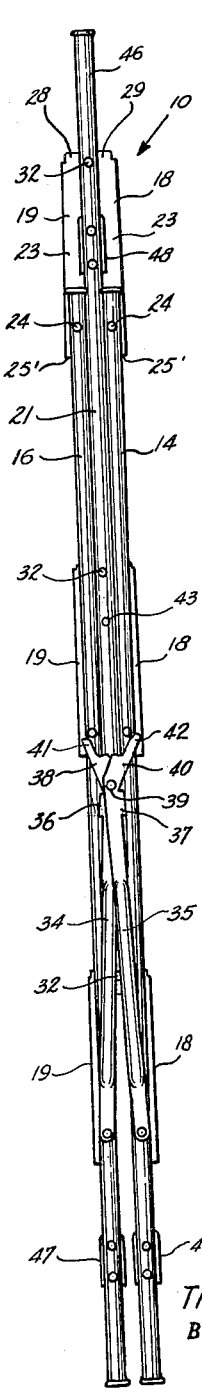
FIG. 3 is an enlarged end elevational view of the rack in its folded position.
Figure 5:
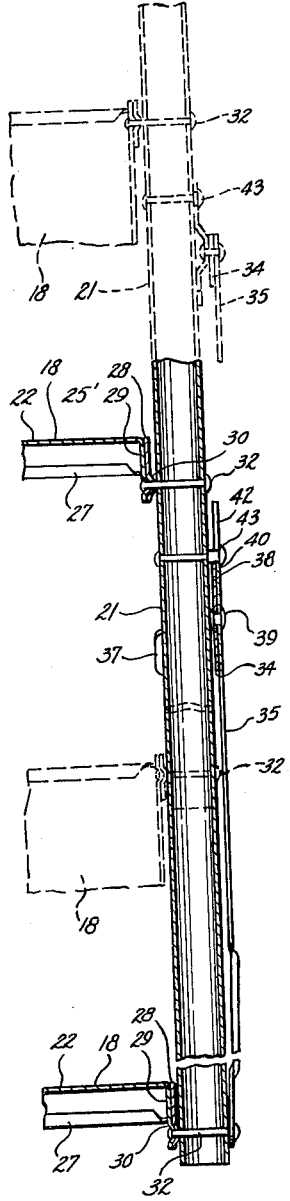
FIG. 5 is an enlarged fragmentary sectional view taken along the line 5—5 in FIG. 2, and showing in full lines the relative positions of a lift member and a slidable stop device in a folded position of the rack, and showing in dotted lines their changed relation in an unfolded position of the rack.

To change the rack 10 from the unfolded position of FIG. 2 to the folded position of FIG. 3, the lift elements 21 are moved upwardly, as illustrated in FIG. 5 where a full line lift element 21 is moved upwardly to a position indicated by dotted lines. This movement is made relatively easy by the lift elements being extended above the surface of the upper shelf 11 sufficient to permit their upper ends or hand grips (FIGS. 1 and 2) to be grasped by the hands of the user. The length of the rack 10 is such that one person standing to one side of the rack may easily grasp both hand grips 46.

Initial upward movement of the lift elements 21 simultaneously breaks or unhinges each pair of shelf members 18 and 19 at their center or longitudinal axes 17. Continued upward movement of the lift elements 21 provides for a pivoting, collapsing type action of each pair of shelf members 18 and 19. Thus, as their inner sides 25 move pivotally upwardly and away from each other, the outer sides 25' of the shelf members move inwardly and toward each other.

The reversed inclined movement of each shelf member 18 relative to its opposite shelf member 19 continues until the upward lifting movement of the element 21 moves the shelf members into a back-to-back relation. In this position, the shelf members 18 and 19 and their supports 14 and 16, respectively, are virtually suspended in a straight depending alignment on each side of the lift element 21 as best illustrated in FIG. 3. In this compact, folded position, the rack 10 can stand on its four supports 14 and 16 by itself due to the balanced symmetrical relationship of all parts.

A pair of elongated side braces 47 are extended between the pairs of supports 14 and 16 for stability of the rack 10, as is a single brace 48 extended between the center lift elements 21. It may readily be observed that the triangular shape of the lips 28 and 29 for the upper shelf 11 provides for a spacing between the insides or backs of the shelf members 18 and 19 sufficient to accommodate the brace 48 therebetween when the shelf members are folded.

To unfold the rack 10 for use, the user merely grasps the side flanges 25' (FIG. 3) of the upper shelf 11, for example, and pulls them outwardly and away from each other. This movement is transmitted to the lower shelves 12 and 13 by the supports 14 and 16, whereby all the shelf members are swung outwardly accordingly. As the shelves are unfolded toward a horizontal position, the weight of the lift members 21 helps to pull the inner side flanges 25 of the shelf members 18 and 19 downwardly until the downward movement of the lift members 21 is stopped by the stop pins 43 (FIG. 2) engaging the notches 44 formed between the brace projections 41 and 42.

Although a preferred embodiment of this invention has been described herein, it is to be remembered that various modifications can be made thereto without departing from the full scope of the invention as defined in the appended claims.

I claim:

1. A collapsible rack comprising a pair of spaced upright members, a shelf hinged at one side to said members for swingable movement on one side of said members in one direction to an unfolded position, another shelf hinged at one side to said members for swingable movement on the other side of said members in one direction to an unfolded position, a pair of upright supports hinged to the other side of each of said shelves whereby each member is disposed between a pair of supports, and means pivotally connected between two of said supports and a corresponding member for locking said corresponding member in a first position wherein said shelves are horizontally disposed, said corresponding member movable to a second position wherein said shelves are vertically disposed, each upright member including an extension at the upper end thereof adapted to be grasped by the hand and which remains so adapted during movement of said shelves from said first position to said second position.

2. A collapsible rack comprising, a pair of longitudinally spaced, upright lift elements, a pair of upright longitudinally spaced supports arranged to each side of said lift elements, a shelf unit including a pair of shelf members, each of said shelf members being hinged to said lift elements and to one pair of said supports, said lift elements being vertically movable and including extensions extended above said shelf unit which are adapted to be grasped by the hand for moving said lift elements from a lower position wherein said shelf members are horizontally disposed to an upper position wherein said shelf members are vertically disposed, and means for locking each of said lift elements in a lower position including a pair of braces pivotally secured at their one ends to separate transversely aligned supports, said pair of braces pivotally connected together at their other ends and each having an ear at said other end partially encircling the adjacent lift element and each having further an upstanding projection, said projections forming a notch, said lift elements having stop means formed thereon for engagement with said notches for supporting said lift elements in said lower position.

3. A collapsible rack comprising a shelf unit movable to folded and unfolded positions thereof, said shelf unit including a pair of shelf members which in the unfolded position of said unit are horizontally arranged in a side-by-side relation, pivotal connecting means for pivotally connecting together the adjacent sides of said shelf members, an upright support hinged at each outer corner of said shelf unit, and lift means connected with said pivotal means for moving said shelf members into a vertically arranged folded position, locking means pivotally connecting said lift means to said upright supports, and means on said lift means for coacting with said locking means for limiting the movement of said shelf units to a horizontal unfolded position while allowing unrestricted movement of said shelf members to a vertical folded position.

References Cited in the file of this patent

FOREIGN PATENTS

| 286,458 | Great Britain | Mar. 8, 1928 |
| 1,133,044 | France | Nov. 12, 1956 |